(12) United States Patent  
Maul et al.

(10) Patent No.: US 6,251,456 B1
(45) Date of Patent: Jun. 26, 2001

(54) PATTERNED CHOCOLATE COATINGS, METHODS, AND APPARATUS FOR PREPARING SAME

(75) Inventors: Gary P. Maul, Columbus; William French, Dublin, both of OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/417,628

(22) Filed: Oct. 14, 1999

Related U.S. Application Data (62) Division of application No. 09/359,399, filed on Jul. 23, 1999, now abandoned.

(51) Int. Cl.[7] .............................. A23G 3/20; A23G 9/26
(52) U.S. Cl. ............................. 426/306; 426/68; 426/91; 426/100; 426/101; 426/103; 426/249; 426/307; 118/667
(58) Field of Search .............................. 426/68, 91, 100, 426/101, 103, 249, 306, 307; 99/450.1, 450.4; 118/667

(56) References Cited

U.S. PATENT DOCUMENTS

| | | |
|---|---|---|
| 615,191 | 11/1898 | Lembke . |
| 1,470,524 | 9/1923 | Burt . |
| 1,777,896 | 10/1930 | Rossi . |
| 1,865,097 | 6/1932 | Gilham . |
| 2,246,871 | 6/1941 | Balch ..................................... 107/54 |
| 2,288,970 | 7/1942 | Weisbender .......................... 99/137 |
| 2,418,190 | 4/1947 | Overland ................................ 107/54 |
| 2,457,110 | 12/1948 | Burbank et al. ....................... 99/134 |
| 2,570,031 | 10/1951 | Gibson ................................... 99/137 |
| 2,646,757 | 7/1953 | Hackmann .............................. 107/1 |
| 2,774,314 | 12/1956 | Moser ..................................... 107/1 |
| 3,091,194 | 5/1963 | Dickinson .............................. 107/54 |
| 3,230,906 | 1/1966 | MacManus . |
| 3,285,202 | 11/1966 | MacManus . |
| 3,288,052 | 11/1966 | Hough . |
| 3,427,650 | 2/1969 | Woody .................................. 118/667 |
| 3,545,981 | 12/1970 | Klein et al. ........................... 99/138 |
| 3,556,022 | 1/1971 | Westin .................................. 107/54 |
| 3,572,256 | 3/1971 | Westin . |
| 3,690,896 | 9/1972 | Maxwell ................................. 99/81 |
| 3,770,460 | 11/1973 | Vroman ................................. 426/279 |
| 3,818,859 | 6/1974 | Kalmar .................................. 118/24 |
| 3,824,950 | 7/1974 | Woody .................................. 118/14 |
| 3,971,853 | 7/1976 | Crowder ................................ 426/249 |
| 4,105,801 | 8/1978 | Dogliotti ................................. 426/99 |
| 4,189,502 | 2/1980 | Rubenstein ........................... 426/249 |
| 4,200,658 | 4/1980 | Katzman et al. ..................... 426/512 |
| 4,369,200 | 1/1983 | Iwao et al. ........................... 426/660 |
| 4,382,968 | 5/1983 | Akutagawa .......................... 426/249 |
| 4,421,773 | 12/1983 | Akutagawa .......................... 426/249 |
| 4,477,473 | 10/1984 | Schoonmaker et al. ............. 426/231 |
| 4,563,358 | 1/1986 | Mercer et al. ......................... 426/89 |
| 4,587,128 | 5/1986 | Cummings ........................... 426/303 |
| 4,622,891 | 11/1986 | Cramer et al. ...................... 99/450.4 |
| 4,758,143 | 7/1988 | Lopes ..................................... 425/91 |
| 4,778,683 | 10/1988 | Newsteder .......................... 426/249 |
| 4,873,104 | 10/1989 | Butcher et al. ...................... 426/249 |
| 4,910,661 | 3/1990 | Barth et al. ..................... 364/167.01 |
| 4,986,080 | 1/1991 | Grigoli et al. .......................... 62/75 |
| 5,019,404 | 5/1991 | Meisner ................................ 426/249 |

(List continued on next page.)

*Primary Examiner*—Nina Bhat
(74) *Attorney, Agent, or Firm*—Winston & Strawn (57) ABSTRACT

A product with a striped coating, method for making, and an apparatus for applying a coating to a confectionery to produce a confectionary with a striped appearing coating. The striped appearing coating preferably includes more than one type of chocolate, preferably two types of chocolate. Advantageously, the striped appearing coating is formed from two layers of chocolate, a foundation chocolate layer and a striped chocolate layer, thus giving the striped appearing chocolate coating a three dimensional texture.

21 Claims, 3 Drawing Sheets

U.S. PATENT DOCUMENTS

| | | | |
|---|---|---|---|
| 5,229,149 | 7/1993 | Cone | 426/91 |
| 5,248,338 | 9/1993 | Price | 106/712 |
| 5,256,426 | 10/1993 | Tomioka et al. | 426/100 |
| 5,343,710 | 9/1994 | Cathenaut et al. | 62/71 |
| 5,374,436 | 12/1994 | White et al. | 426/249 |
| 5,435,143 | 7/1995 | Heinrich | 62/75 |
| 5,447,036 | 9/1995 | Heinrich | . |
| 5,480,664 | 1/1996 | Ferrero | 426/307 |
| 5,516,540 | 5/1996 | Cathenaut | 426/249 |
| 5,582,856 | 12/1996 | White et al. | 426/249 |
| 5,720,175 | 2/1998 | White et al. | 62/76 |
| 5,891,246 | 4/1999 | Lund | 118/13 |
| 5,951,766 | 9/1999 | Miller | 118/667 |

PATTERNED CHOCOLATE COATINGS, METHODS, AND APPARATUS FOR PREPARING SAME

This applications is a divisional application of Ser. No. 09/359,399, filed Jul. 23, 1999, now abandoned.

TECHNICAL FIELD

The invention relates to striped coatings for confectionaries, preferably iced confection novelties such as ice cream bars, and to methods and apparatus for depositing such coatings.

BACKGROUND OF THE INVENTION

Coated ice confections or ice cream novelties are popular products. Generally, these products have a solid chocolate coating that is applied by dipping an ice cream bar into a bath of liquid chocolate coating material. The products are cooled to solidify the coating and the resulting product is then packaged.

If desired, two separate layers of coatings, either of the same or different flavors or colors, can be provided in such products. It is not easy to apply a patterned or discontinuous coating onto the ice cream bars as they move along a production line. Particularly, it is difficult to produce chocolate coatings having a striped appearance formed from two layers of chocolate, principally because there is only a very short time period within which the second layer must be applied to the first layer in order to achieve satisfactory adherence. The chocolate layers are usually applied in liquid, semi-liquid, or paste form either by spraying, pouring, dipping, or pressing in a cold environment. Generally, this procedure results in the first layer glazing over to form a frost of condensation shortly after application thereof (less than 30 seconds), which prevents the second liquid layer from adhering properly.

Several references disclose different types of chocolate or other edible coatings having the adherence problems discussed above. For example, U.S. Pat. No. 1,777,896 discloses an edible container shaped like a log made by spreading a plastic edible coating on the outside of a cylinder, adding bonbons to simulate branch stubs, and covering with a second layer of chocolate in a semi-liquid or plastic state.

U.S. Pat. No. 1,865,097 discloses hollow candy bodies made of chocolate having areas of the body formed with a color contrasting with the color of a major portion of the body. The hollow candy body may be prepared by chilling a dark chocolate in a portion of a mold, closing the mold and filling the mold with a light color chocolate, and chilling the mold again to form the light chocolate body overlaid by dark chocolate patches.

U.S. Pat. No. 2,288,970 discloses a confectionery such as ice cream having a coating of chocolate or other edible composition. In particular, the coating is provided with line formations or perforations that are pressed into the coating to control and limit the separation of coating from the confectionery product.

U.S. Pat. No. 2,457,110 discloses a method of coating chocolate edibles by dip-coating the chocolate edible in a coating of sufficiently low viscosity without the addition of cocoa butter. The chocolate is disclosed to be non-flowing at high temperatures due to the lack of cocoa butter in the composition during the dipping.

U.S. Pat. No. 3,971,853 discloses a frozen confection having a plurality of ingredients of individual colors, as well as a gravity feed arrangement for feeding a plurality of nozzles with the individually-colored ingredients so as to facilitate greater distribution of the ingredients.

U.S. Pat. No. 4,189,502 discloses marshmallow and other variegates having the ability to maintain a clear and distinct line of demarcation or delineation with a frozen dessert matrix into which the variegate is incorporated.

U.S. Pat. No. 4,369,200 discloses a method for producing three-dimensional decorations of a fatty confectionery material on a base confectionery, such as with a nozzle attached to a compressible bag for depositing the decorations. The deposition preferably occurs from a rotary sprayer, which deposits the decoration by use of a plurality of recesses in a mold.

U.S. Pat. No. 4,587,128 discloses a method of making an iced piece of cake and providing good adhesion between the icing coating and the cake by adding a bonding layer to a cake, applying the icing, completely enrobing it with a chocolate layer, cooling and solidifying the chocolate layer, and subsequently decorating the top and sides by pressing thereon "squiggles" having a different color.

We have now devised an apparatus and methods for obtaining coatings having a striped appearance, as well as confectionery or ice cream products having a coating formed thereon from two layers of coating material, whereby the second layer adheres satisfactorily to the first layer.

SUMMARY OF THE INVENTION

The present invention is directed to a method of making a striped confectionary product by providing at least one confectionary with a first surface and a liquid coating, and subsequently simultaneously applying a series of stripes of liquid coating upon the confectionary while moving the confectionary along a production line. Thereafter, the coating is solidified to form a striped confectionary product.

Optionally, the method includes applying a layer of at least one coating material onto the confectionary by dipping, enrobing, or spraying. The latter can be applied either before or after the stripes are applied onto the confectionary. Included among the coating materials applied are milk chocolate, dark chocolate, white chocolate, or combinations thereof, optionally the chocolate is partially substituted with a lesser fat component.

A confectionary coated using the present invention include but are not limited to a frozen dessert, ice cream, baked product, praline, cake, fondant, water ice, sherbet, wafer cone, ice cream sandwich component, or cookie.

The stripes can be applied essentially at the same time with a uniform spacing between them in a striped fashion or a non-linear fashion with at least two changes in direction, such as a crisscross pattern. The stripes can be applied when the confectionary is in a horizontal position or a vertical position. The stripes can be of a color or coating material that is different from other stripes being applied to the confectionary; for example, a confectionary with a crisscross pattern can have different types of chocolates such as milk chocolate, dark chocolate, white chocolate, or combinations thereof, and the chocolate may be partially substituted with a lesser fat component. Optionally, the confectionary may have at least two surfaces and stripes are provided on each surface, with the stripes being of the same or different color or coating material.

The method may also comprise collecting and re-using liquid coating material or chocolate that is dispensed but not applied upon the confectionary.

The present invention is also directed to an apparatus for applying stripes of coating material on a confectionary wherein at least one nozzle applies a stripe of coating material onto the confectionary as the confectionary moves past the nozzle in a production line. The apparatus includes one or more manifolds to provide the nozzle or nozzles with coating material in liquid form and having a viscosity and temperature sufficient to prevent plugging of the nozzle; one or more link member for moving the nozzles to apply different configurations of the stripes onto the confectionary as it moves past the nozzle. Where a plurality of nozzles are provided, the nozzles are mounted on the manifold and at least two link members are provided for moving the manifold in X and Y directions during coating application.

The present invention is also directed to a system for providing a striped coating on a confectionary wherein the above described apparatus, is included within a production line for moving confectioneries past the apparatus so that a stripe of coating material can be applied onto a confectionary at it moves past the nozzle. Included within the system is a tank for collecting coating material that is dispensed from the nozzle but which is not applied upon the confectionary for re-use of the material. The production line can rotate the confectionary from a vertical position to a horizontal position such that the stripes are applied while the confectionary is in the horizontal position. When a plurality of nozzles are used, the nozzles are mounted on the manifold and at least two link members are provided for moving the manifold in X and Y directions for applying the stripes of coating material onto the confectionary; the movement of the link member is effectuated by connecting the link member to an air cylinder, rotary actuator, linear actuator, linear electrical motor, rotary electrical motor, or combinations thereof. Additionally, the nozzles are mounted on the manifold and the manifold is rotated by the link member to apply the stripes in the form of a laced coating upon the confectionary.

The present invention is also directed to a striped confectionary product having a first surface and a plurality of stripes of coating material applied upon the first surface of the confectionary. The striped confectionary includes but is not limited to a frozen dessert, ice cream, baked product, praline, cake, fondant, water ice, sherbet, wafer cone, ice cream sandwich component, or cookie. The confectionary product may include a layer of chocolate on the confectionary, wherein the stripes, essentially the same size and with a uniform spacing, are present under or on top of the chocolate layer, wherein the chocolate layer includes one of milk chocolate, dark chocolate, white chocolate, or combinations thereof. Optionally, the stripes are non-linear and included at least two changes in direction, and some of the stripes can be of a color or coating material that is different from the others. The product includes stripes that are in the form of a laced coating, preferably wherein the laced coating comprises at least two different chocolates where at least on chocolate is milk chocolate, dark chocolate, white chocolate, or combinations thereof, optionally where the chocolate is partially substituted with a lesser fat component.

The confectionary product may have at least two surfaces and stripes which are provided on each of the surfaces, with the stripes being of the same or a different color or coating material.

DETAILED DESCRIPTION OF THE INVENTION

The present invention advantageously provides a method for making and an apparatus for applying a chocolate coating to a confectionery to produce a confectionary with a striped appearing coating. The striped appearing coating preferably includes more than one type of chocolate, preferably two types of chocolate. Advantageously, the striped appearing coating is formed from two layers of chocolate, a foundation chocolate layer and a striped chocolate layer, thus giving the striped appearing chocolate coating a three dimensional texture.

The present invention provides several advantages including a rapid, efficient, and systematic process for making repeatable coating patterns on individual or multiple confectioneries. Another advantage of the process for making a confectionary with a striped coating is the ease of making uniform crisscross line patterns or undulating line patterns which are generally symmetrical. Yet another advantage of the present invention, is the ability to create a three dimensional layered striped coating on a confectionary. Another advantage of the present invention is the ability to create a wide range of simple and intricate patterns using relatively simple mechanical linkages; an increasing selection of patterns is possible using motion control in addition to purely mechanical methods.

The invention is directed to the method and apparatus for making striped appearing coatings on confectioneries. The striped appearing coatings comprise at least one striped appearing layer, optionally, a foundation layer and a second striped appearing layer.

As used herein, the term "foundation layer" means a layer covering the entire confectionary.

As used herein, the term "striped" means a repeating symmetrical or geometric pattern of continuous or discontinuous stripes spaced at uniform intervals resulting in pin-striping, crisscrossed, undulating, sinusoidal, serpentine, wave-like, repeating letter or series of letters, or the like stripe patterns. The design of the apparatus described herein will primarily dictate the type of striped appearance on the confectionary or confectionery product being coated. Dotted or dashed stripes can also be applied if desired.

As used herein, the term "confectionery" include frozen desserts, ice cream novelties, baked products, and similar confectionery products which may conventionally be coated with chocolate, e.g., praline, cake, fondant, water ice, sherbet, or other filling, also associated food products such as but not limited to wafer cones, ice cream sandwich components, cookies, and other similar comestibles.

As used herein, the term "rotating applicator" means an object capable of rotating while providing one or more continuous or discontinuous stream(s) of coating material, preferably chocolate.

The foundation layer may be continuous or discontinuous and prepared from one or more types of chocolate or coating materials. Preferably, the foundation layer is formed from different chocolates, chocolates of different colors, coating materials, or combinations thereof. The foundation layer can have two chocolate layers having different textures or appearances, e.g., plain chocolate, milk chocolate, or white chocolate. Optionally, the foundation layer can have a chocolate coating followed by a coating with coating materials or vice versa. Coatings in which one layer includes either milk or plain chocolate and the other layer includes white chocolate are the most interesting visually because there may be a marked contrast between the darker colored, milk, or plain chocolate, and the white chocolate.

Each foundation layer of has a thickness between about 0.1 mm to about 2 mm, preferably between about 0.25 mm to about 1.5 mm, and more preferably between about 0.5 mm to about 1 mm.

The chocolate may be, ordinary chocolate according to accepted regulations or it may be a fat containing confectionery compound material containing sugar, milk derived components, and fat and solids from vegetable or cocoa sources in differing proportions having a moisture content less than about 10 percent, preferably less than about 5 percent by weight. The fat-containing material may be a chocolate substitute containing direct cocoa butter replacements, stearines, coconut oil, palm oil, butter, or any mixture thereof, nut pastes such as peanut butter and fat; praline; confectioner's coatings used for covering cakes usually comprising chocolate analogues with cocoa butter replaced by a less expensive non-tempering fat; or CARAMAC, a mixture of non-cocoa butter fats, sugar, and milk sold by Nestlé.

The striped appearing layer may have a symmetrical or geometric pattern of crisscross stripes spaced at uniform intervals resulting in a pin-striping effect. The pattern includes generally vertical continuous or discontinuous stripes crossed by generally horizontal continuous or discontinuous stripes, generally angled stripes crossed by a second set of generally angled stripes, or a set of stripes crossed by a second set of stripes forming a series of parallelograms. Additionally, the surface can be distorted to provide a less striped effect, a roughly continuous or roughly discontinuous pin-stripe effect. The striped appearing layer may also have an undulating stripe pattern, such as a repeating sinusoidal wave pattern with one or more sinusoidal wave patterns repeated on the coating. Additionally, the striped appearing layer may also have a repeating symmetrical design such as a repeating letter, series of letters, design, or the like. As noted above, the stripes can be solid or broken into dots, dashes or combinations thereof.

Although each of these are desired arrangements of the striped coating according to the invention, it should be understood that any design incorporating these or other similar arrangements may be provided to the coating.

The process of the present invention includes preparing a coating having a striped appearance which comprises applying at least one striped appearing coating to a confectionary. Optionally, a foundation layer can be applied to the confectionary prior or after applying the striped appearing coating, if desired modifying the surface, and solidifying the coating. Additionally, a second striped appearing coating can be applied to the confectionery after a foundation layer has been applied.

The foundation layer is applied to a confectionery by any method know in the art. The foundation layer can be applied by dipping, enrobing, or spraying a chocolate coating onto the confectionary. The coating may include one or more types of chocolates, coating materials, or mixtures thereof which are applied simultaneously or stepwise. Optionally, the surface of the foundation layer can be altered by any means known in the art to alter surface texture. Preferably, the foundation layer comprises at least one chocolate.

Subsequently, the confectionary is a passed through a series of rotating applicators that deposit strings or droplets of at least one type of chocolate coating or coating material onto the confectionary. Preferably, the first chocolate or coating material advantageously differs from the second chocolate or coating material, e.g., one chocolate is plain or milk and the other is white, one material is chocolate and the other is strawberry. Various ratios of two chocolate layers or chocolate layer and coating material layer may be used to achieve different effects.

A typical sequence for applying a striped appearing layer comprises passing at least one confectionary by a series of rotating applicators in an up and down motion. The time between each up and down motion should be between about 0.25 s to about 2 s, preferably between about 0.75 s to about 1.5 s, more preferably for about 1 s. Alternatively, a striped appearing coating can be applied to one or more confectioneries while the apparatus with a series of rotating applicators is made to move in an up and down motion.

In one embodiment of the present invention, a confectionary product with a chocolate coating having the appearance of either stripes or spots may be obtained by applying a first chocolate to the confectionary product by enrobing, spraying or dipping to coat the confectionery product with a first layer of chocolate, and then passing the confectionery product between the opposing faces of a pair of rotating disks or nozzles from which are projected streams of a second chocolate by centrifugal force onto the coated confectionary product, and then solidifying the coating. The second chocolate may be applied onto the rotating disks or into the nozzles by pumping the chocolate through tubing, e.g., stainless steel tubing.

In another embodiment of the present invention, a confectionary product with a striped appearing coating, e.g., either stripes or spots, may be obtained by applying a coating onto the confectionary product by passing the confectionery product between the opposing faces of a pair of rotating disks or nozzles from which are projected streams of a chocolate or coating material by centrifugal force onto the confectionary product, and then solidifying the coating. The chocolate or coating material may be applied into the nozzles by continuously or intermittently pumping the chocolate or coating material through tubing, e.g., stainless steel tubing. The time of the intermittent pumping can determine whether dots, dashes or longer line segments are deposited on the confectionary. Control of the pumping device can be easily achieved by a computer or microprocessor that is appropriately programmed by one of ordinary skill in the art.

In yet another embodiment of the present invention, a confectionary product with a striped coating may be obtained by applying stripes of coating material onto the confectionary product by passing the confectionery product in either a horizontal or vertical position past a stationary applicator that has several holes or nozzles from which are projected continuous or discontinuous streams of a chocolate or coating material onto a first side of the confectionary product, rotating the confectionary to align a second side with the applicator, and then applying a second series of stripes of coating material onto the second or opposite face of the confectionery product. The stripes then solidify to form the striped confectionary product. The applicator can have several holes or nozzles, move in either a vertical or horizontal manner, and provide either a continuous or discontinuous stream of chocolate or coating material.

The stripes or striped coating may also be applied to a confectionery in the apparatus in various ways, for example by spraying or pouring the coating from disks onto the product, by dipping the product into a coating stream, or by passing the product through the apparatus, such as on a conveyor belt. Extruded stick products and cake products are particularly suitable for passing through the apparatus. The relative motions of the apparatus and the product to be coated may be altered by one of ordinary skill in the art to obtain the desired pattern on the coated product. Different embodiments of the apparatus, such as using cups or pipes in place of the disks, are discussed in more detail below.

The confectioneries are held by the conveyor belt or production line in a horizontal or vertical position and parallel to the applicator. The confectioneries can be held either permanently or temporarily in either a vertical or horizontal position, i.e., the conveyor may interchangeably rotate the confectionary between vertical or horizontal positions for any time duration. Typically, one or more confectioneries are held in a vertical position to apply a foundation coating, subsequently, the confectioneries are either held in the vertical position or rotated to a horizontal position to apply the striped coating. Optionally, when a foundation layer is not applied, the confectioneries may be held in a vertical or horizontal position during the coating process.

In all the above processes for preparing a confectionery or ice cream product with a chocolate coating having a striped appearance, the chocolate used may be tempered or untempered chocolate, liquid, and the melting temperature may be from between about 28° C. to about 60° C., preferably from between about 35° C. to about 45° C.

Thereafter, the confectionary with the striped appearing coating is allowed to cool at a sufficient temperature and for a sufficient time to hardened the coating. Temperature and time are dependent on coating material, therefore, one of ordinary skill in the art with little or no experimentation can determine the appropriate conditions for a particular coating material. The product is stored and packaged for shipping using methods commonly known in the art.

The apparatus of the present invention comprises a series of applicators, a manifold, and linkage which are combined into one element. The apparatus is compact and simple which allows the apparatus to be incorporated into existing equipment with great flexibility. The apparatus is easily placed into a moving individual, group, or row of confectionaries, thus, eliminating the need to reconfigure existing product machinery.

Wherein the applicator spins, the rotating applicators include nozzles, cups, disks, tubes, or any device known in the art to apply chocolate or coating material by centrifugal force. The nozzles, cups, disks, tubes, can apply continuously or discontinuously a stream of chocolate or coating material by means of a pump. An interruption of pump flow can create a discontinuous stream of chocolate or coating material to form dots, dashes or other line segments.

The rotating applicators may be made of one or more materials that may safely contact edible products, but are preferably metal to provide durability, and more preferably stainless steel. When the rotating applicator is a disk, the disks may be substantially circular or elliptical and may be of various sizes, it is possible for disks to have different shapes or sizes than other disks, preferably, the disk is elliptical in shape and the flat surface may advantageously be inclined from the horizontal, e.g., up to about 45° and preferably from between about 5° to about 35°. Advantageously, the inclination is arranged such that the edges of the disks downstream of the direction of conveyance of the confectionery product are closer than the edges of the disks upstream of the direction of conveyance of the confectionery product.

When using a nozzle, the motion of the nozzle prevents blockages and facilitate maintaining flow through the nozzle. The nozzle may move up and down, side to side, or a combination thereof. Turbulence at and near the entrance to the nozzle is created by motion of the manifold, which in combination with the nozzle design, can reduce the problem of plugging caused by agglomerates or particulates in the nozzle passage. The reduction of plugging allows use of higher viscosity fluids, e.g., lower temperature, higher solids loading, etc.

Typically, a nozzle has a very short land length, i.e, the nozzle has a length to diameter ratio of between about 1 to about 5. Preferably the length is about 0.005" and the diameter is about 0.025". The nozzle design can include a simple pressure nozzle with no "dead leg" volume where low velocities or stagnation can occur. Additionally, the nozzle has a divergent geometry wherein the nozzle passage increases from inlet to tip.

Optionally, the nozzles can be stationary, attached to a tube which rotates, oscillates in a side to side motion (X direction), up and down motion (Y direction), or combinations thereof. The stationary nozzles can be held either vertically or horizontally and the stationary nozzles can be made to move in relation to the confectionary or the confectionary can be made to move in relation to the stationary nozzles.

The applicators may be operated by a pump generating a pressure of from, e.g., between about 50 psi to about 150 psi, and preferably from between about 75 psi to about 125 psi.

The rotating applicators are preferably mounted facing the front and rear center of the bars. Each bar may be passed, for example, vertically or horizontally between the rotating applicators. The rotating of the applicators may be achieved by a variable drive motor for each applicator or one or more motors and a timing belt, however, any suitable rotating means may be used for rotating the applicators. The design on the confectionery product may be arranged by altering the speed of the rotating applicators. The speed of the rotating applicators is preferably at least about 50 rpm and may be up to about 2500 rpm or more, depending on the space constraints dictated by the machine on which the product is to be made. The speed of the rotating applicator which produces stripes or spots is a function of the distance between the applicator and the product to be coated.

The applicators may be mounted inside a jacketed tank heated above the melting point of the chocolate or coating material, preferably from between about 35° C. to about 45° C., by circulating heated water. The tank may be made of any suitable material, such as metal, and is preferably stainless steel. The heated jacket enables the excess chocolate or coating material that has been projected by centrifugal force from the applicators, after coating the confectionery product, to collect on the inside of the tank in a liquid form and then exit the tank for recirculation.

The manifold of the apparatus of the present invention is attached to the applicator or nozzles and is capable of delivering a fluid to the applicator or nozzles for forming a striped appearing coating on a confectionary. When using nozzles, either rotating or stationary, the manifold can deliver a static pressure at the nozzle entrance sufficient to produce a relatively weak jet which minimizes problems associated with a high velocity jet impinging on an oblique surface, e.g., splattering. Alternatively, a manifold can produce high velocity flow at the nozzle entrance which maintains a relatively stable nozzle temperature and prevents plugging. Multiple manifolds can be employed moving independently and with differing nozzle patterns and fluids. Optionally, the nozzles are machined into the manifold.

A manifold can include a vibration input to the carrier arm which has the effect of creating rapid changes within the relative motion between the nozzle entrance and the fluid. A manifold can incorporate mixing action devices to minimize plugging problems further upstream within the nozzles. Preferably, this includes turbulators, screens, or similar turbulence creating devices which ensure that the fluid is maintained in a state such that the fluid passes freely through the desired nozzle without plugging. Optionally, the manifold design can incorporate multiple links carrying multiple arrays of jet nozzles which may be driven by a single or multiple drivers.

The link is any system capable of moving the assembly of applicators and manifold relative to the product, such as, moving the applicator further from the product surface, changing the pattern applied to the confectionary, moving the entire assembly of applicators and manifold to design a pattern, or maintaining the applicators and manifold static while the product is manipulated during the coating process. Any of several methods of moving the link can be employed, including but not limited to, air cylinders, actuators (rotary and linear), electric motors (rotary and linear), and other similar devices. Multiple drives carrying multiple arrays of jet nozzles may be driven by single or multiple drivers. Multiple links carrying multiple arrays of jet nozzles may be incorporated into the link design.

Figure 1:
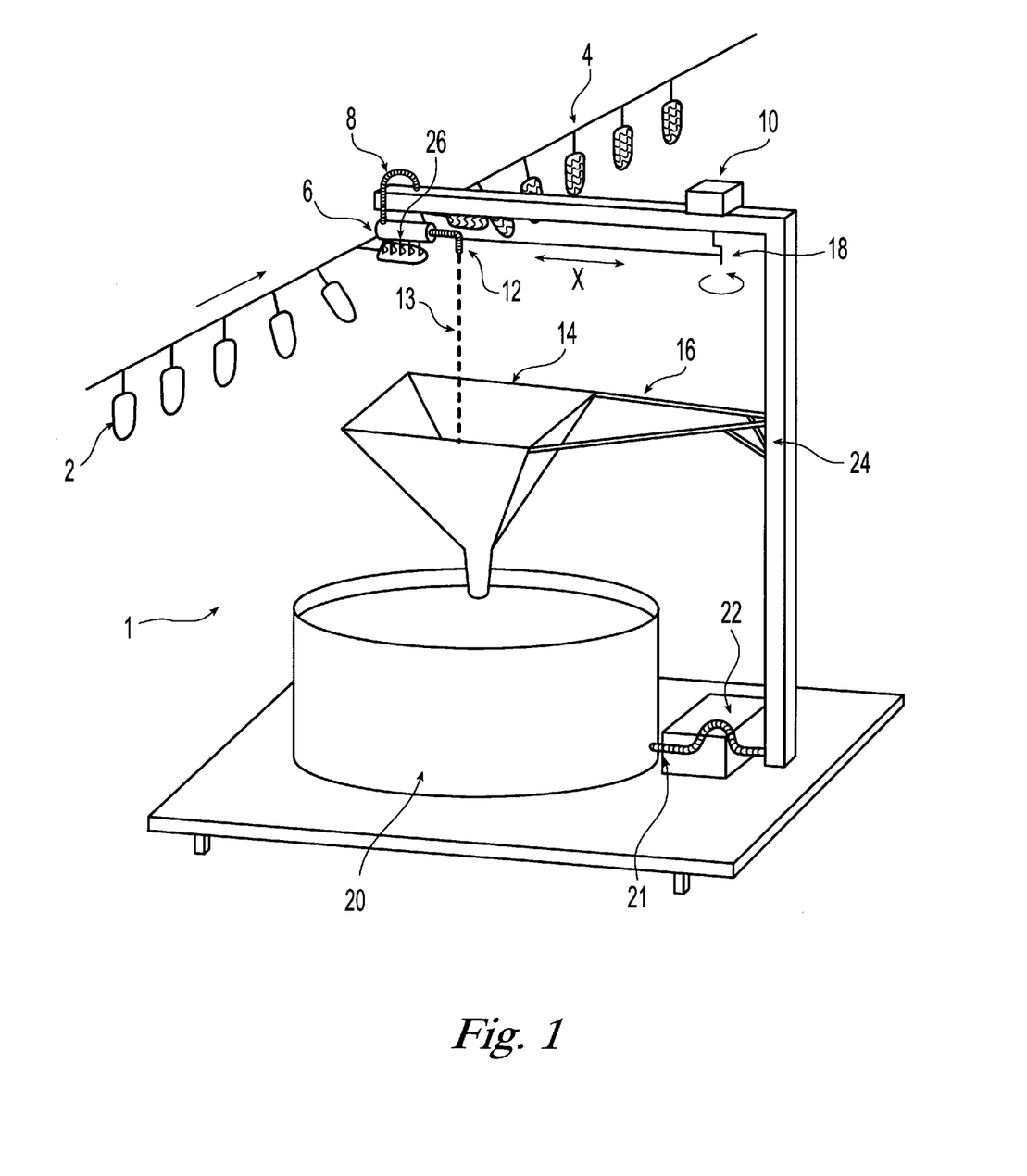
FIG. 1, illustrates a simplified layout of one embodiment of an apparatus of the present invention and the process of applying stripes onto a confectionary in a horizontal position.
Figure 2:
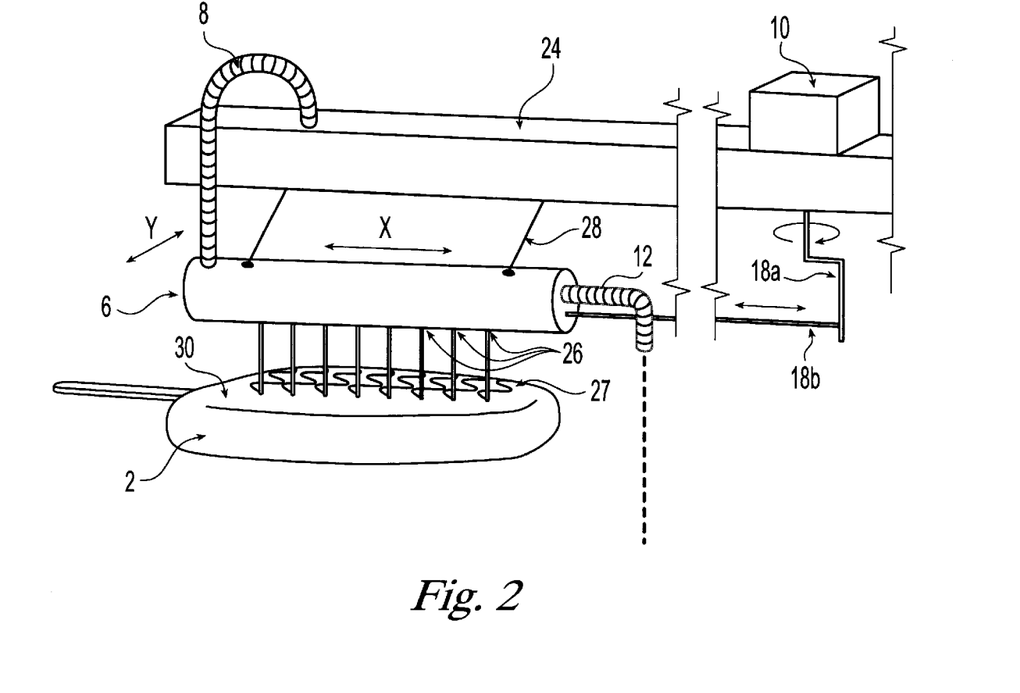
FIG. 2, illustrates a close view of the stripe coating applicator and the process of applying stripes onto a confectionary in a horizontal position.

Referring to FIGS. 1 and 2, one embodiment of the present invention is shown wherein an apparatus 1 applies a series of stripes 27 onto a confectionary 2. A conveyor 4 transports at least one confectionary 2 and positions the confectionary in a horizontal position while a non-rotating applicator 6, substantially parallel to the confectionary 2, simultaneously applies a series of stripes 27 by moving in directions X (substantially parallel of the plane of the paper) and Y (perpendicular to the X direction) relative to the confectionary. The stripes 27 are applied onto the confectionary 2 with at least one applicator 6 with at least one nozzle 26. A motor 10 connected to an eccentric link system 18 controls the direction of the applicator in directions X and Y relative to the confectionary. The applicator 6 is supplied with a coating material, preferably chocolate, through at least one manifold 8 and the overflow coating material 13 is directed to a jacketed tank 14 through an overflow tube 12. The jacketed tank 14 may also collect excess coating material which spills off the confectionary 2. The jacketed tank 14 is attached to a supporting structure 24, which may be "L" shaped or any other shape that maintains the applicator 6 substantially parallel to the confectionary 2, by supporting arms 16 and directs the overflow coating material 13 into a collector 20 wherein the overflow coating material may be recycled and feed through tube 21 into manifold 8 by a pump 22.

FIG. 2 illustrates a closer view of apparatus 1 comprising a stationary applicator 6 held in a horizontal position. The applicator 6 comprises at least one manifold 8, which supplies the applicator with coating material, preferably chocolate, at least one nozzle 26 for applying the coating material onto the confectionary, and an overflow tube 12 for redirecting any coating material overflow 13 into the jacketed tank 14. The motion of the applicator is controlled by a motor 10 and an eccentric link system 18 comprising an eccentric leaver 18a and a shaft 18b which direct the motion of the applicator in X and Y directions relative to the confectionary. The applicator simultaneously applies a series of stripes 27 onto one surface 30 of the confectionary 2.

FIG. 2 also illustrates the method of applying a series of stripes 27 onto a surface 30 of the confectionary 2, as the confectionary is held in a horizontal position during a process wherein a non-rotating applicator 6 is held substantially parallel in a horizontal position relative to the confectionary 2 by the support structure 24.

Figure 3:
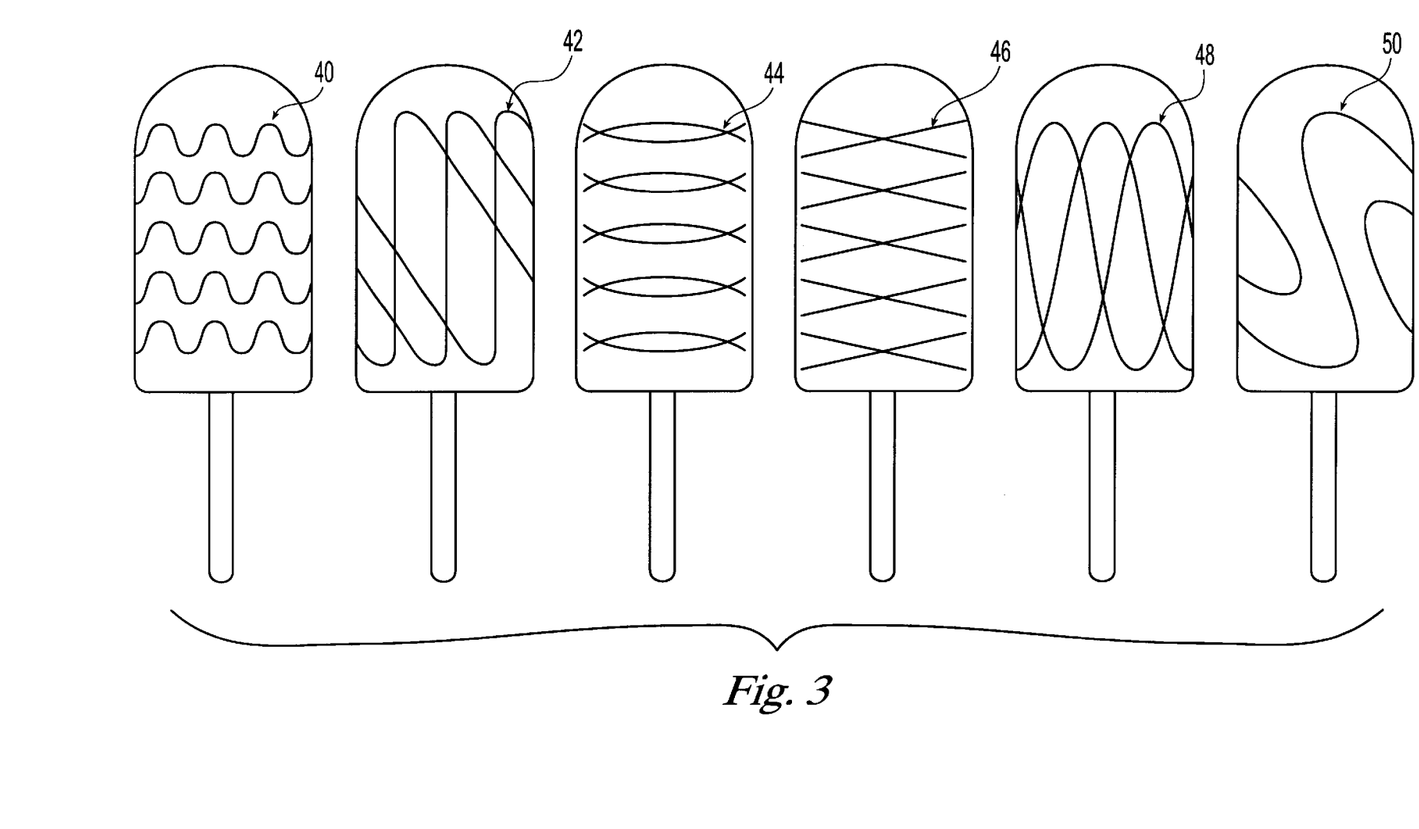
FIG. 3, illustrates several design patterns contemplated by the present invention.

FIG. 3 illustrates a series of patterns as contemplated in the present invention. Patterns 40, 42, 44, 48, and 50 illustrate an undulating pattern wherein the lines may be generally parallel, as in 40 and 50, the lines may overlap one another, as in 42, 44, and 48, and the lines have a generally sinusoidal pattern, as in 40, 42, 48, and 50. Pattern 46 illustrates a crisscross stripe pattern contemplated in the present invention.

What is claimed is:

1. A method of making a striped confectionary product comprising the steps of:

providing at least one confectionary having a first surface;

providing a liquid coating material;

simultaneously spraying a plurality of spaced stripes of liquid coating material from an applicator upon the first surface of the confectionary as the confectionary moves vertically past the applicator; and solidifying the stripes on the confectionary to form a striped confectionary product.

2. The method according to claim 1, wherein the confectionary is at least one frozen dessert, ice cream, baked product, praline, cake, fondant, water ice, sherbet, wafer cone, ice cream sandwich component, or cookie.

3. The method according to claim 1, which further comprises applying a layer of at least one chocolate onto the confectionary to form a coated confectionary.

4. The method according to claim 3, wherein the layer is applied by dipping, enrobing or spraying the confectionary with the chocolate used to form the layer comprising milk chocolate, dark chocolate, white chocolate, or combinations thereof, and optionally where the chocolate is partially substituted with a lesser fat component.

5. The method according to claim 3, which further comprises applying the chocolate layer onto the confectionary prior to spraying the stripes thereon.

6. The method according to claim 3, which further comprises applying the chocolate layer onto the confectionary after spraying the stripes thereon.

7. The method according to claim 1, wherein the stripes are applied at essentially the same size and with a uniform spacing therebetween on the confectionary as it moves vertically past the applicator.

8. The method according to claim 1, wherein the stripes are non-linear and include at least two changes in direction.

9. The method according to claim 1, wherein at least some of the stripes are of a color or coating material that is different from the others.

10. The method according to claim 1, which further comprises collecting and re-using liquid coating material that is sprayed but not applied upon the confectionary.

11. The method according to claim 1, wherein the stripes are applied in the form of a crisscrossed pattern.

12. The method according to claim 11, wherein the crisscrossed pattern comprises at least two different chocolates wherein at least one chocolate comprises milk chocolate, dark chocolate, white chocolate, or combinations thereof, and optionally where the chocolate is partially substituted with a lesser fat component.

13. The method according to claim 1, wherein the confectionary has at least two surfaces and stripes are provided on each of the surfaces, with the stripes being of the same or a different color or coating material.

14. A coating apparatus for applying stripes of liquid coating material on a confectionary comprising:

a conveyor for moving the confectionary along a path;

a holding member associated operatively associated with the conveyor for at least temporarily holding the confectionary in a vertical position;

at least one nozzle for spraying a stripe of coating material onto the confectionary as the confectionary moves past the nozzle on the conveyor while being held in the vertical position;

at least one manifold containing coating material in a liquid form having a viscosity and temperature sufficient to prevent plugging of the nozzle, the manifold being operatively associated with the at least one nozzle for providing the coating material(s) thereto; and at least one link member for moving the nozzle(s) to control the configuration of the stripe(s) as they are sprayed onto the confectionary.

15. The apparatus of claim 14, wherein the plurality of nozzles are provided in order to provide a plurality of stripes onto the confectionary, with the nozzles being mounted on the manifold, and at least two link members are provided for moving the manifold in X and Y directions when applying the stripes of coating material onto the confectionary.

16. A system for providing a striped coating on a confectionary which comprises:

the coating apparatus of claim 14; and a tank for collecting coating material that is dispensed from the nozzle(s) but which is not applied upon the confectionary for re-use of the material.

17. The system of claim 16, wherein a plurality of nozzles are provided in order to provide a plurality of stripes onto the confectionary, with the nozzles being mounted on the manifold, and at least two link members are provided for moving the manifold in X and Y directions when applying the stripes of coating material onto the confectionary.

18. The system of claim 17, wherein the manifold is rotated by the link member to apply the stripes in the form of a laced coating upon the confectionary.

19. The system of claim 16, wherein the movement of the link member is effectuated by connecting the link member to an air cylinder, rotary actuator, linear actuator, linear electrical motor, rotary electrical motor, or combinations thereof.

20. The method according to claim 1, wherein the confectionary moves past the applicator in a suspended fashion.

21. The apparatus of claim 14, wherein the confectionary moves past the applicator in a suspended fashion.

* * * * *